US008511618B2

(12) United States Patent
Butte

(10) Patent No.: US 8,511,618 B2
(45) Date of Patent: Aug. 20, 2013

(54) PRESSURE-BASED SEPARATION APPARATUSES

(75) Inventor: Ronald J. Butte, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 980 days.

(21) Appl. No.: 12/398,467

(22) Filed: Mar. 5, 2009

(65) Prior Publication Data

US 2010/0224730 A1    Sep. 9, 2010

(51) Int. Cl.
*B64G 1/64* (2006.01)
*F42B 15/36* (2006.01)

(52) U.S. Cl.
USPC .............. 244/173.3; 102/377; 403/32

(58) Field of Classification Search
USPC .............. 244/172.4, 173.1–3, 159.4, 158.3, 244/158.1; 403/31, 32, 344, 361; 102/377
See application file for complete search history.

(56) References Cited

U.S. PATENT DOCUMENTS

| 3,431,854 | A | * | 3/1969 | Rabenhorst | 102/377 |
| 3,501,112 | A | * | 3/1970 | Bamford | 244/158.1 |
| 4,520,975 | A | | 6/1985 | Blackhurst | |
| 4,867,357 | A | * | 9/1989 | Inglis et al. | 244/121 |
| 5,253,587 | A | | 10/1993 | Thouron et al. | |
| 5,927,653 | A | * | 7/1999 | Mueller et al. | 244/171.3 |
| 6,289,818 | B1 | * | 9/2001 | Mueller et al. | 102/377 |

* cited by examiner

*Primary Examiner* — Joseph W Sanderson
*Assistant Examiner* — Michael Kreiner
(74) *Attorney, Agent, or Firm* — Schwegman Lundberg & Woessner, P.A.

(57) ABSTRACT

Embodiments of separation apparatuses are generally described herein. Other embodiments may be described and claimed. In an embodiment, a separation apparatus is provided that is configured to be disposed between a first component and a second component associated with an aerospace vehicle. The separation apparatus comprises a sealed cavity filled with gas, and the separation apparatus is configured to expand based on a decrease in atmospheric pressure. This expansion is configured to separate the first component from the second component.

4 Claims, 5 Drawing Sheets

306 FRANGIBLE JOINT

US 8,511,618 B2

PRESSURE-BASED SEPARATION APPARATUSES

FIELD

The present disclosure relates generally to separation devices. In an embodiment, the disclosure relates to pressure-based separation apparatuses.

BACKGROUND

A variety of devices is used for separating rocket stages. Examples of current separation devices include pyrotechnic devices, hydraulic devices, and spring-based devices that impart a force or velocity to a lower rocket stage to separate the lower rocket stage from an upper rocket stage. Spring-based separation devices are heavy, impart a load on the rocket at all times, and have limited stroke capability. Pyrotechnic and hydraulic separation devices are complex devices that are comprised of many components, such as batteries, electrical or explosive input lines, connectors, and arm-fire devices. The weights of these components decrease the rocket's speed and range. Furthermore, the pyrotechnic separation devices are dangerous to handle because of explosives and the explosion of the separation pyrotechnic devices may exert a large amount of shock load that may damage fragile machinery.

SUMMARY

In an embodiment, a separation apparatus is provided that is configured to be disposed between a first component and a second component associated with an aerospace vehicle. The separation apparatus is comprised of a sealed cavity filled with gas, and the separation apparatus is configured to expand based on a decrease in atmospheric pressure. The expansion separates the first component from the second component.

In another embodiment, a bag is provided that is configured to be disposed between an upper rocket stage and a lower rocket stage. This bag is filled with gas that expands based on a decrease in atmospheric pressure. The expansion separates the upper rocket stage from the lower rocket stage.

In yet another embodiment, a separation apparatus is provided that is configured to be disposed between a first component and a second component associated with an aerospace vehicle. This separation apparatus comprises a cylinder and a piston seated inside the cylinder. A cavity formed between the cylinder and the piston is filled with gas, and the piston is configured to exert a separation force from an expansion of the gas based on a decrease in atmospheric pressure. This separation force is exerted to separate the first component from the second component.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

The embodiments described herein provide a variety of separation apparatuses that separate or eject attached components used in aerospace vehicles, such as rockets, missiles, aircrafts, helicopters, and spacecrafts (e.g., satellites and space shuttle). An example of such a separation apparatus is placed between two components. This separation apparatus includes a cavity filled with gas, which may be at an atmospheric pressure at sea level. As explained in more detail below, this separation apparatus is configured to expand when placed at an altitude above sea level, and the expansion separates the two components from each other.

Figure 1:
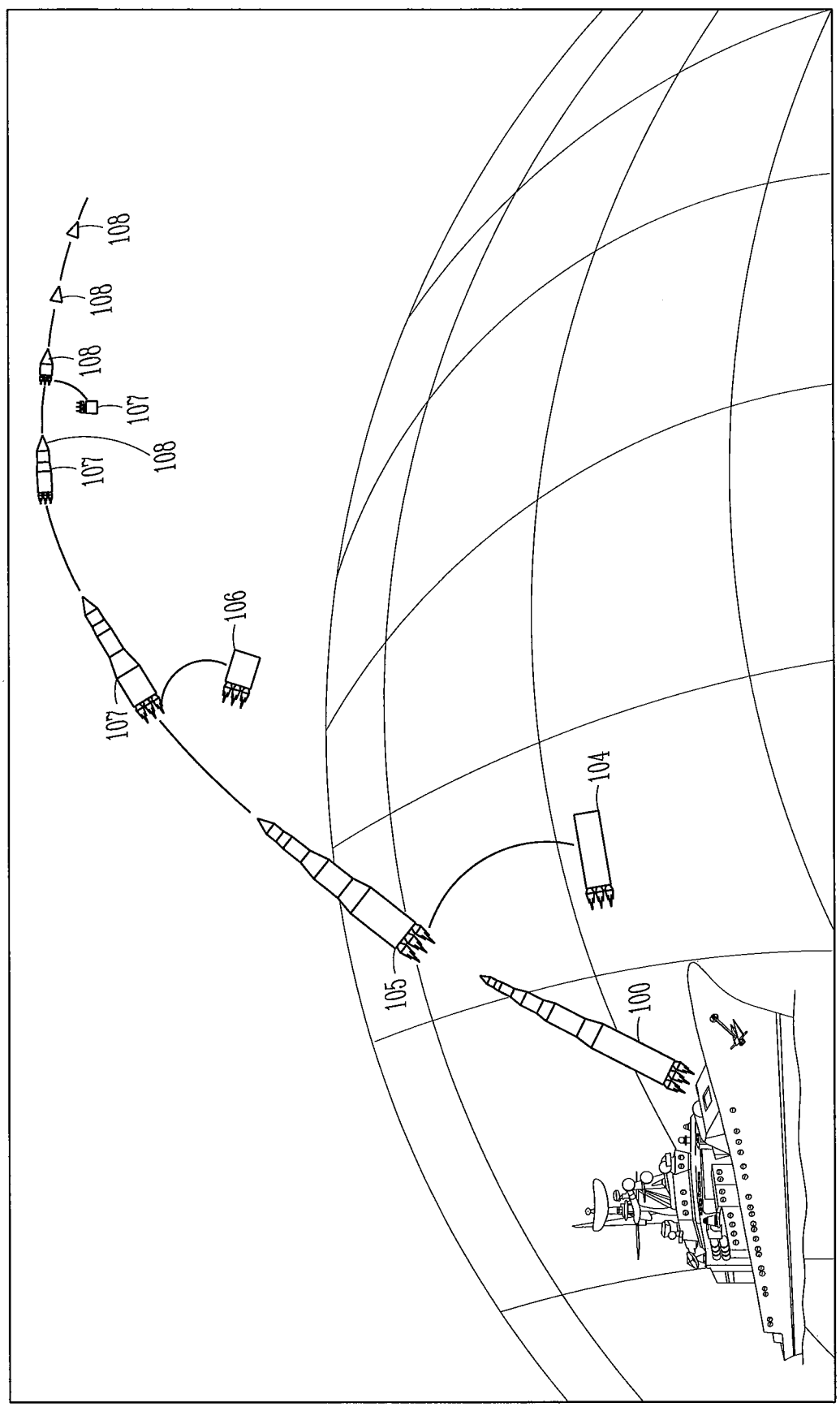
FIG. 1 depicts a diagram of a flight trajectory of a rocket.

FIG. 1 depicts a diagram of a flight trajectory of a rocket 100. The rocket 100 launches from a ship at sea level and follows an ascending trajectory. The rocket 100 is comprised of multiple rocket stages 104-108 that separate from each other at various altitudes along the ascending trajectory. At each separation point along the ascending trajectory, at least one rocket stage 104, 105, 106, 107, and/or 108 separates from another rocket stage 104, 105, 106, 107, and/or 108. For example, shortly after launch, the upper rocket stage 105 separates from the lower rocket stage 104 and continues along the ascending trajectory. After the upper rocket stage 105 has ascended to a particular altitude, the upper rocket stage 105 separates further into two rocket stages 106 and 107.

Before the launch, the rocket 100 on the ship is located at sea level. The atmospheric pressure at sea level is approximately 14.70 pounds per square inch absolute (psia). The "atmospheric pressure," as used herein, refers to a pressure exerted by a planet's atmosphere. The atmospheric pressure is caused by a weight of the atmosphere and decreases with increase in altitude because there is less overlaying atmospheric mass. The following Table A defines the various atmospheric pressures at different altitudes.

TABLE A

| Altitude Above Sea Level (feet) | Absolute Atmospheric Pressure (psia) |
|---|---|
| 100,000 | 0.16 |
| 90,000 | 0.26 |
| 80,000 | 0.41 |
| 70,000 | 0.65 |

TABLE A-continued

| Altitude Above Sea Level (feet) | Absolute Atmospheric Pressure (psia) |
|---|---|
| 60,000 | 1.05 |
| 50,000 | 1.69 |
| 40,000 | 2.73 |
| 30,000 | 4.37 |
| 20,000 | 6.76 |
| 10,000 | 10.10 |
| 0 | 14.70 |

As the rocket 100 ascends, the atmospheric pressure exerted on the rocket 100 decreases, and embodiments of the invention use this change in atmospheric pressure to separate the rocket stages 104-108. In particular, the rocket 100 includes multiple separation apparatuses that are disposed between the rocket stages 104-108. As will be explained in more detail below, each separation apparatus includes a sealed cavity filled with gas, and the separation apparatus is configured to expand based on the decrease in the atmospheric pressure. The expansion of the separation apparatus exerts a separation force to separate, for example, a set of rocket stages 104-105, 106-107, or 107-108.

Figure 2A:
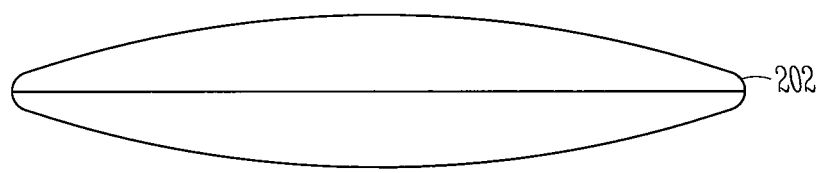
FIGS. 2a, 2b, and 2c depict external views of an embodiment of a separation apparatus, in the form of a bag.
Figure 2B:
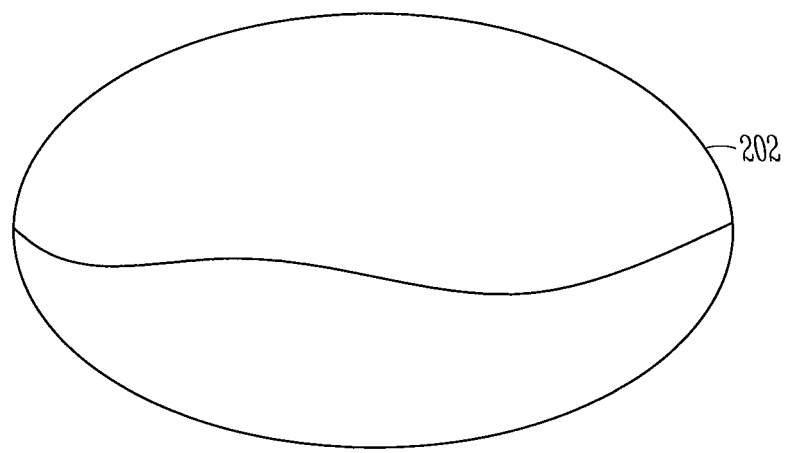
Figure 2C:
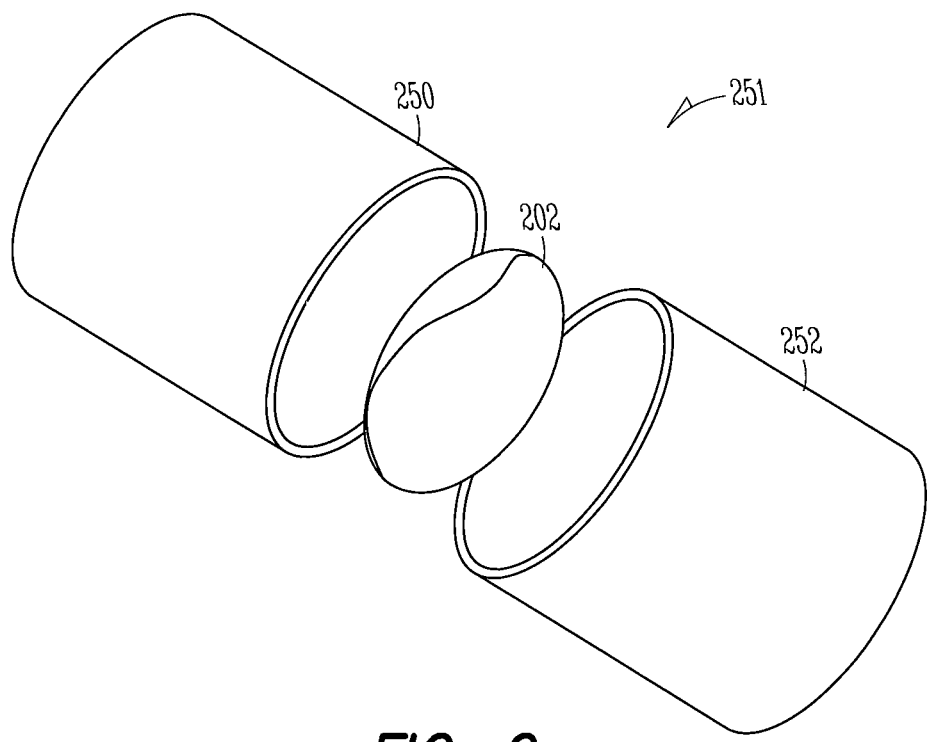

FIGS. 2a, 2b, and 2c depict external views of an embodiment of a separation apparatus in the form of a bag 202. The bag 202 is a flexible container formed from cloth, polyester fiber, nylon fabric, plastic, or other flexible materials. The bag 202 is filled with gas, such as air, nitrogen, helium, oxygen, or other gases. In an embodiment, the bag 202 is gas tight or hermetically sealed where the gas cannot escape the bag 202. In an alternate embodiment, the bag 202 may be formed from a porous, flexible material where some gas may escape.

In an embodiment, as depicted in FIG. 2a, the bag 202 is partially filled with non-pressurized gas at sea level and, as a result, the internal pressure of the bag 202 equals the atmospheric pressure at sea level. When the bag 202 is brought to an altitude above sea level, the atmospheric pressure exerted on the bag 202 is less than the internal pressure of the bag 202, which is at sea level pressure. As a result, as depicted at FIG. 2b, the bag 202 filled with gas at sea level is configured to expand at higher altitudes based on the expansion of the gas.

It should be appreciated that the internal pressure of the bag 202 does not necessarily need to be equal to the atmospheric pressure at sea level. In an alternate embodiment, the bag 202 may be filled with gas at a pressure that is higher or lower than the atmospheric pressure at sea level. For example, the bag 202 may be filled with gas at a pressure that is slightly higher than the atmospheric pressure at sea level (e.g., 17 psia). As long as there is a pressure difference between the inside and outside of the bag 202, the bag 202 will either contract or expand.

As depicted in FIG. 2c, the bag 202 is configured to be disposed between two components associated with an aerospace vehicle, such as between an upper rocket stage 250 and a lower rocket stage 252 of a rocket 251. This bag 202 is not integrated into either the upper rocket stage 250 or the lower rocket stage 252. Rather, the bag 202 is configured to be removable from both upper and lower rocket stages 250 and 252. When the bag 202 is stowed within the rocket 251 at sea level, as depicted in FIG. 2a, the bag 202 does not exert any significant separation force on both upper and lower rocket stages 250 and 252 because the internal pressure of the bag 202 equals the atmospheric pressure at sea level. Returning to FIG. 2c, when the rocket 251 ascends to an altitude above sea level, the bag 202 expands as a result of a decrease in atmospheric pressure. This expansion of the bag 202 exerts a separation force to both upper and lower rocket stages 250 and 252 to separate the upper rocket stage 250 from the lower rocket stage 252. The bag 202 is lightweight and does not require many components (e.g., wires, power sources, and electrical or pyrotechnic connections). Furthermore, the bag 202 can also generate a large stroke from a small stowed state.

It should be appreciated that in addition to upper and lower rocket stages 250 and 252, the separation apparatus (e.g., bag 202) may be configured to separate or eject a variety of other components associated with aerospace vehicles. Examples of such components include nose cones, heat shields, warheads, and other components.

Figure 3A:
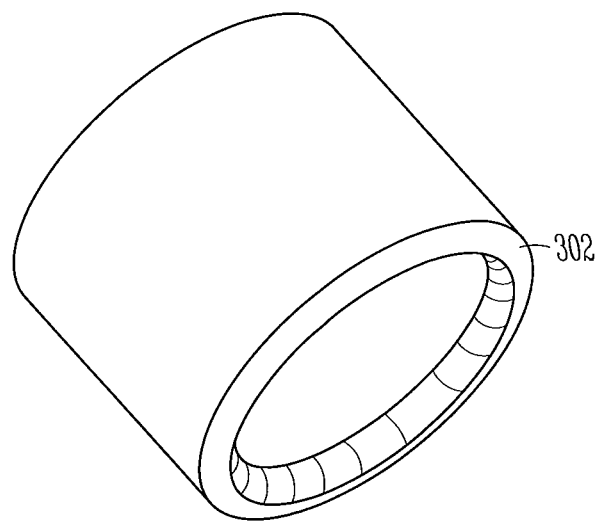
FIG. 3a depicts an external view of another bag, in accordance with an alternative embodiment, that is used to separate one component from another component.

FIG. 3a depicts an external view of another bag 302, in accordance with an alternative embodiment, that is used to separate one component from another component. It should be appreciated that the bag 202 depicted in FIGS. 2a-2c may have a variety of different shapes. In the embodiment depicted in FIGS. 2a-2c, the bag 202 may be in the shape of a three-dimensional oval. In an alternate embodiment, as depicted in FIG. 3a, the bag 302 may be in the shape of a toroid. Other bag shapes include, for example, a cylinder, a cone, a three-dimensional polygon, or other shapes.

Figure 3B:
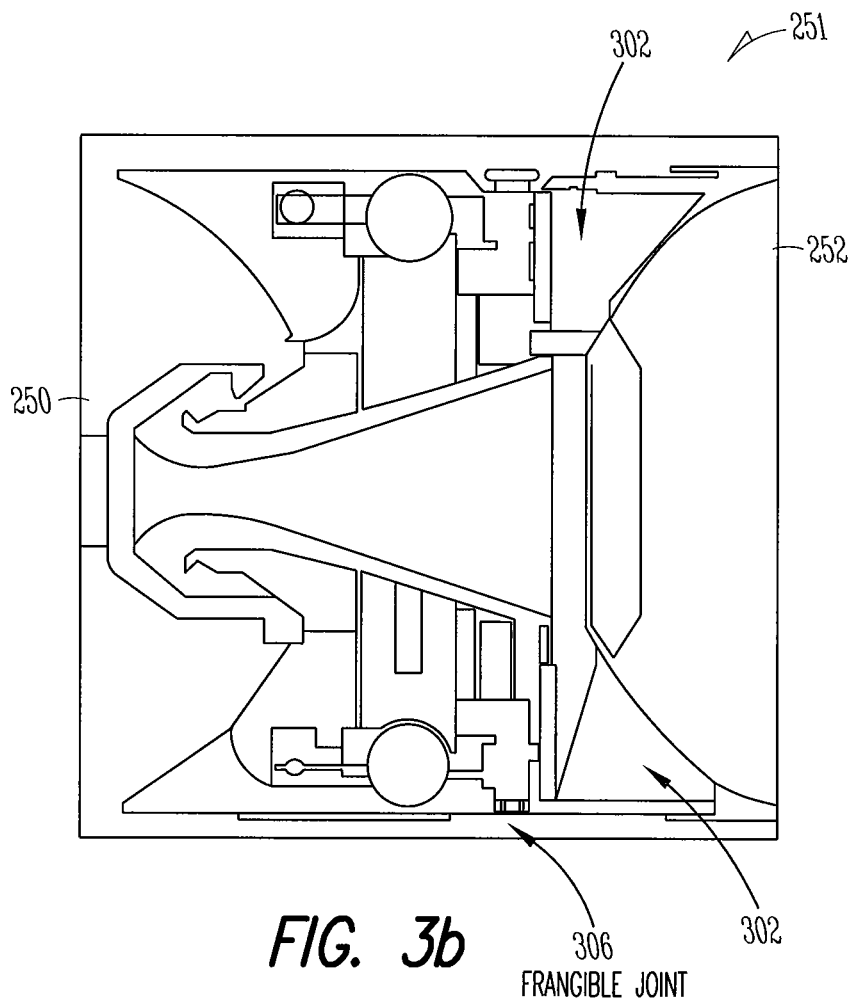
FIG. 3b depicts a detailed cross-sectional view of a portion of the rocket that includes a bag fitted between the upper rocket stage and the lower rocket stage, in accordance with an embodiment.

FIG. 3b depicts a detailed cross-sectional view of a portion of the rocket 251 that includes a bag 302 fitted between the upper rocket stage 250 and the lower rocket stage 252, in accordance with an embodiment. The upper rocket stage 250 is attached to the lower rocket stage 252 at a frangible joint 306, which is configured to break or fracture when the bag 302 expands to exert a separation force to both upper and lower rocket stages 250 and 252. The bag 302 depicted in FIG. 3a is configured to be fitted or disposed between the upper and lower rocket stages 250 and 252. In particular, as depicted in FIG. 3b, the bag 302 is placed or fitted in a circular space of the lower rocket stage 252 that is close to a section of the rocket 251 attached to the upper rocket stage 250.

Figure 4:
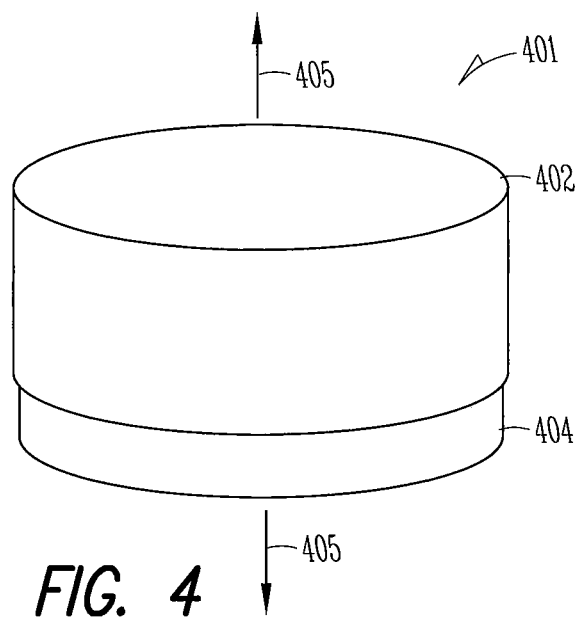
FIG. 4 depicts an external view of another embodiment of a separation apparatus.

FIG. 4 depicts an external view of another embodiment of a separation apparatus 401. Here, the separation apparatus 401 comprises a first cylindrical member 402 and a second cylindrical member 404. The first cylindrical member 402 is shaped like a cap having two ends where one end is open and the other is closed. In one embodiment, the second cylindrical member 404 may have the same shape as the first cylindrical member 402. In an alternate embodiment, the second cylindrical member 404 has a cylindrical shape with both ends closed. The second cylindrical member 404 is seated inside the first cylindrical member 402 through the open end of the first cylindrical member 402 such that the second cylindrical member 404 may slide within the first cylindrical member 402 along directions 405, which are perpendicular to one end of the first cylindrical member 402.

A cavity is formed between the first cylindrical member 402 and the second cylindrical member 404, and this cavity is filled with gas, which may be at atmospheric pressure at sea level. In one embodiment, the cavity is hermetically sealed such that it is gas tight. When the separation apparatus 401 is placed at a high altitude (e.g., 20,000 feet), the decrease in atmospheric pressure causes the gas within the cavity of the separation apparatus 401 to expand. This expansion of the gas exerts a force on both cylindrical members 402 and 404 to push the cylindrical members 402 and 404 away from each other, thereby expanding the apparatus 401 along directions 405. The separation apparatus 401 is configured to be disposed between at least two components of an aerospace vehicle, and the expansion of the separation apparatus 401 is configured to exert a separation force on the two components.

Figure 5:
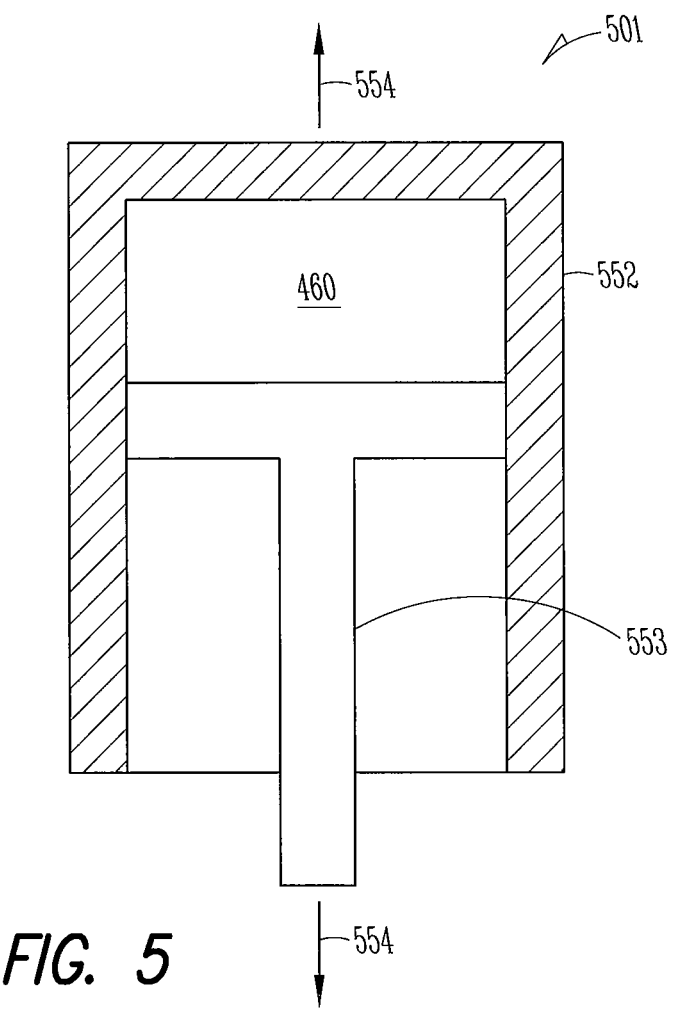
FIG. 5 depicts a cross-sectional view of yet another embodiment of a separation apparatus.

FIG. 5 depicts a cross-sectional view of yet another embodiment of a separation apparatus 501. Here, the separation apparatus 501 comprises a cylinder 552 and a piston 553.

The piston 553 is seated inside the cylinder 552 and can slide within the cylinder 552 along directions 554 perpendicular to one end of the cylinder 552. A cavity 460 is formed between the cylinder 552 and the piston 553 and the cavity 460 is filled with gas. The cavity 460 can be made gas tight with the use of piston rings (not shown).

A decrease in atmospheric pressure resulting from a change in altitude of the separation apparatus 501 causes the gas within the cavity 460 to expand. In turn, the expansion of the gas exerts a force on the cylinder 552 and the piston 553 along directions 554. In one embodiment, the piston 553 may transfer the force from the expanding gas to directly push one component away from another component. In another embodiment, the piston 553 may transfer the force from the expanding gas to, for example, a mechanism that is configured to separate one component from another component. An example of such a mechanism is a mechanical fastener that is configured to join or attach one component to another component. In this example, the movement or expansion of the piston 553 transfers force to the mechanical fastener to cause it to release one component attached to another component.

Figure 6A:
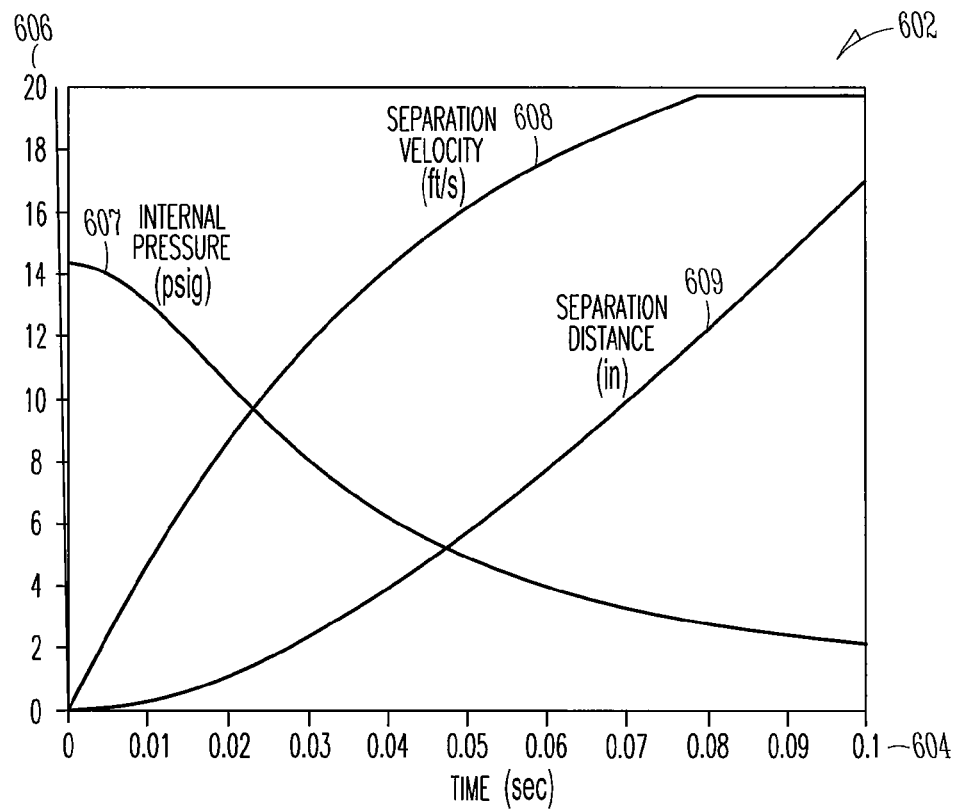
FIGS. 6a and 6b depict plots of various parameters associated with a separation of two rocket stages, consistent with embodiments of the present invention.
Figure 6B:
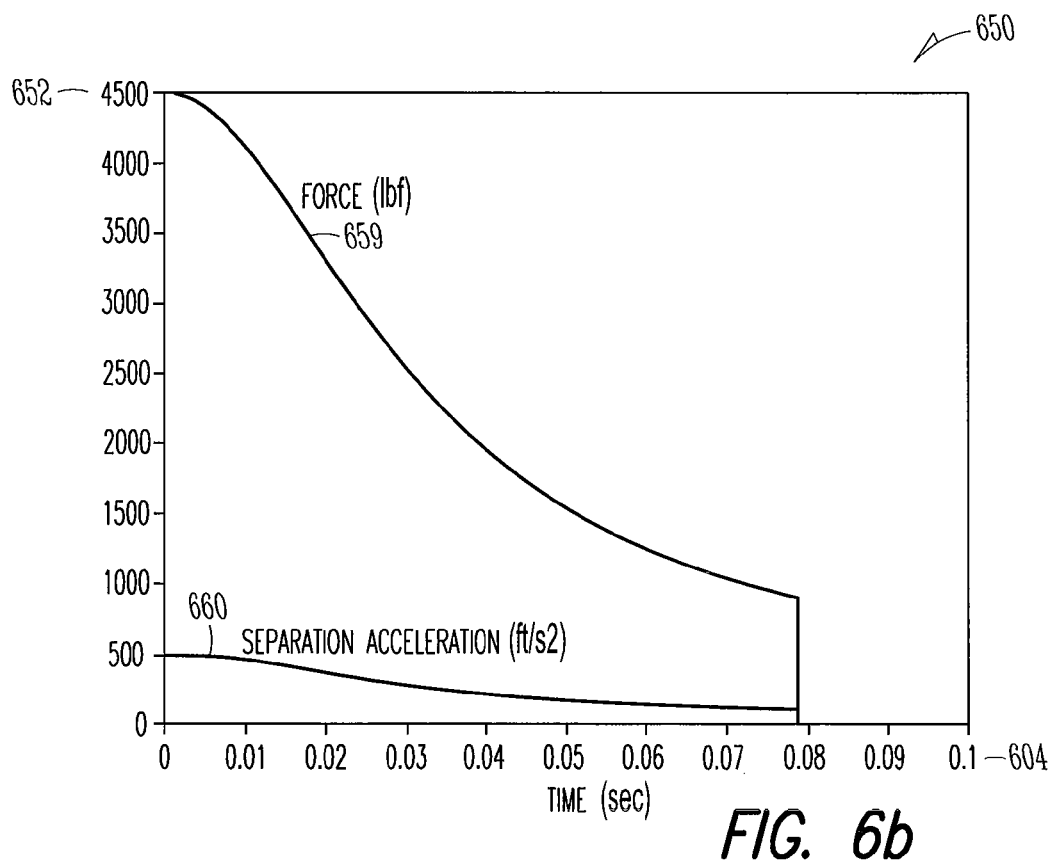

FIGS. 6a and 6b depict plots 602 and 650 of various parameters associated with a separation of two rocket stages, consistent with embodiments of the present invention. As depicted in FIG. 6a, the horizontal axis 604 defines the time increasing from left to right while the vertical axis 606 defines the internal pressure 607, separation velocity 608, and separation distance 609. The separation distance 609 is the relative distance between the two rocket stages and, as depicted in FIG. 6a, it increases with increase in time. The internal pressure 607 is the internal pressure of the separation apparatus and decreases with increase in time.

The separation velocity 608 is the relative velocity between the two rocket stages. That is, the separation velocity 608 is basically how fast the two rocket stages are pushing away from each other. As depicted in FIG. 6a, the separation velocity 608 increases with increase in time but plateaus at approximately 0.08 seconds. This plateau results from the separation apparatus being fully extended; therefore, it cannot exert additional separation force to separate the two rocket stages.

In FIG. 6b, the plot 650 includes a horizontal axis 604 defining the time, which increases from left to right, while the vertical axis 652 defines either the separation force 659 or the separation acceleration 660. The separation force 659 is a force that is exerted on the two rocket stages by the separation apparatus. As depicted in FIG. 6b, the separation force 659 decreases with increase in time. The separation acceleration 660 is the acceleration of the separation of the two rocket stages and also decreases with an increase in time. Both the separation force 659 and the separation acceleration 660 abruptly end at approximately 0.08 seconds because, as discussed above, the separation apparatus is fully extended.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the embodiments of the invention may lie in less than all features of a single disclosed embodiment. Thus the following claims are hereby incorporated into the detailed description, with each claim standing on its own as a separate embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of embodiments of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of embodiments of the invention(s).

What is claimed is:

1. A separation apparatus disposed between an upper rocket stage and a lower rocket stage, the separation apparatus comprising:
    a bag filled with a fixed quantity of gas, wherein the bag is gas tight, the bag configured to expand from an initial deflated configuration to an inflated configuration based on a decrease in atmospheric pressure,
        wherein in the initial deflated configuration the bag has a first deflated shape with the fixed quantity of gas therein, and
        in the inflated configuration the bag has a second expanded shape as the fixed quantity of gas in the bag expands to directly exert a separation force to the upper and lower rocket stage to separate the upper rocket stage from the rocket stage.

2. The bag of claim 1, wherein the bag has a shape of a toroid.

3. The bag of claim 1, wherein the decrease in the atmospheric pressure is based on an increase in altitude of the bag.

4. The bag of claim 1, wherein the gas is air, the air being at atmospheric pressure at sea level.

* * * * *

UNITED STATES PATENT AND TRADEMARK OFFICE
CERTIFICATE OF CORRECTION

Page 1 of 1

PATENT NO. : 8,511,618 B2
APPLICATION NO. : 12/398467
DATED : August 20, 2013
INVENTOR(S) : Ronald J. Butte It is certified that error appears in the above-identified patent and that said Letters Patent is hereby corrected as shown below:

In the Drawings

On sheet 5 of 5, Fig. 6b, delete "(ft/s2)" and insert --($ft/s^2$)--, therefor

In the Specification

In column 1, line 60, delete "apparatus," and insert --apparatus--, therefor

In the Claims

In column 6, line 43, in claim 1, after "the", insert --lower--, therefor

Signed and Sealed this
Twenty-fifth Day of November, 2014

Michelle K. Lee
*Deputy Director of the United States Patent and Trademark Office*